March 17, 1936.    H. S. EBERHARD    2,034,134
ENGINE BREATHER
Filed Jan. 4, 1933
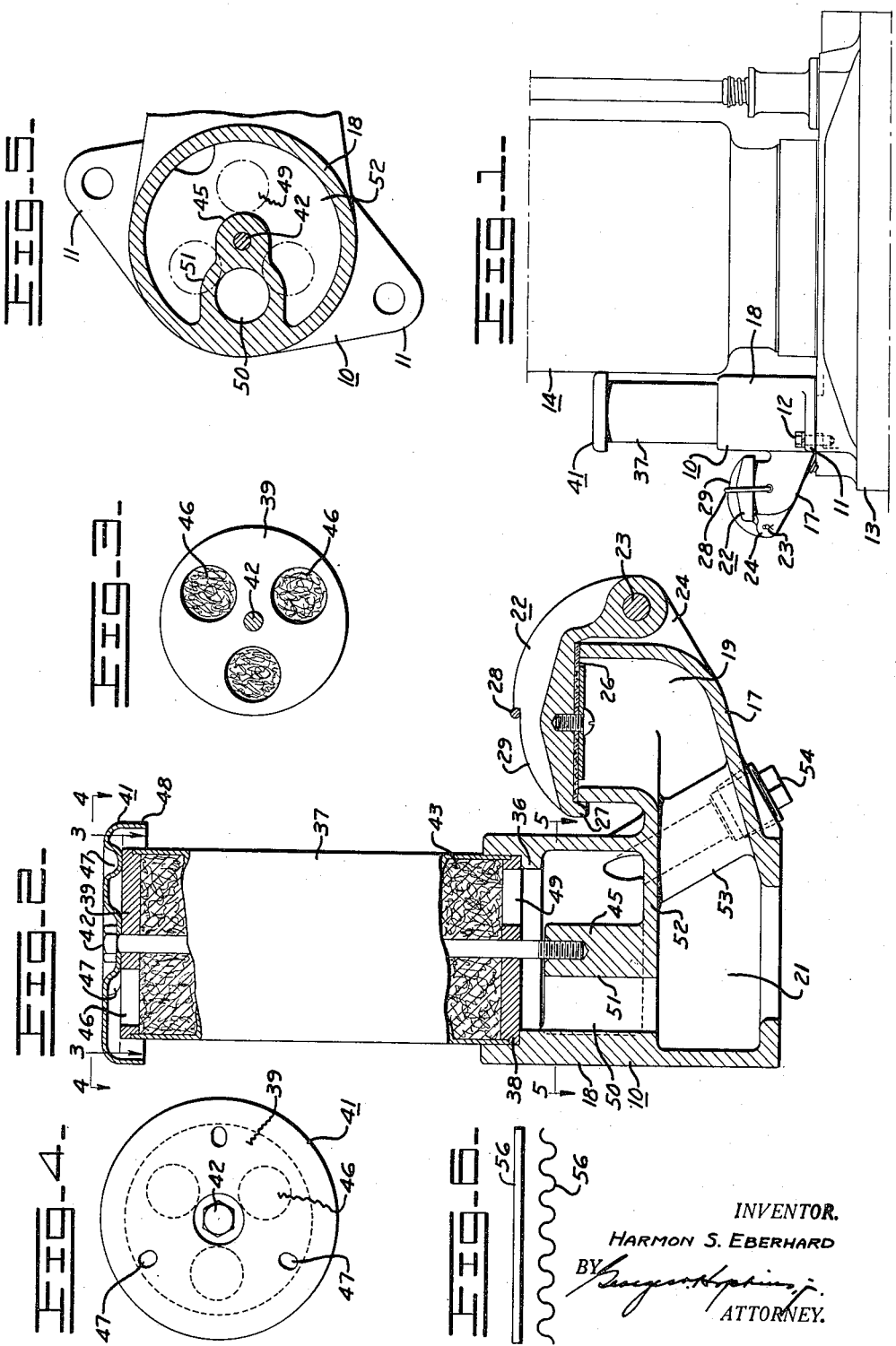
INVENTOR.
HARMON S. EBERHARD
BY
ATTORNEY.

Patented Mar. 17, 1936

2,034,134

UNITED STATES PATENT OFFICE 2,034,134

ENGINE BREATHER

Harmon S. Eberhard, San Leandro, Calif., assignor to Caterpillar Tractor Co., San Leandro, Calif., a corporation of California Application January 4, 1933, Serial No. 650,099

10 Claims. (Cl. 121—194)

The present invention relates to engines and more particularly to the provision of a breather for the crankcase thereof. The breather construction includes a filter for cleaning the air admitted to the crankcase, and a filler elbow whereby lubricant may be placed in the crankcase.

It is an object of the invention to provide a breather of simple construction which can be assembled or disassembled readily.

Another object of the invention is to provide a simple and sturdy mounting for a filtering means.

Another object of the invention is to provide an engine having a breather mounted on the crankcase.

Another object of the invention is to provide a combined breather and oil filler for an engine.

Another object of the invention is to provide a filter of high efficiency and simple construction.

Another object of the invention is to provide a filter element composed of a mass of strands which have line or point contact only.

Another object of the invention is to provide a filter element composed of strands which are regularly deformed.

Another object of the invention is to provide a filter element composed of strips which expose a maximum surface to the fluid medium which passes through the element and which are evenly distributed throughout the entire volume of the filter whereby the medium must contact filtering surfaces in passing through the filter element.

Another object of the invention is to provide a filter construction including a plurality of members which are adapted to be assembled and mounted in a single operation.

Another object of the invention is to provide common means for securing a filter construction in assembled position and for mounting the construction on its base.

Another object of the invention is to provide a cover for a filter which is adapted to permit ingress and egress of a fluid medium to the filter and which has a plurality of spaced contact points with the filter container.

Another object of the invention is to provide a filter construction for removing foreign matter from a fluid medium including a reservoir for retaining matter removed from said medium and a passage through which the filtered medium passes, the arrangement being adapted to prevent entry of foreign material into the passage.

Other objects will appear as the description progresses.

Description of figures

Fig. 1 is a partial end elevation of an internal combustion engine showing the breather and oil filler mounted on the crankcase.

Fig. 2 is a vertical transverse section through the breather and oil filler.

Fig. 3 is a section taken on the line 3—3 in Fig. 2.

Fig. 4 is a plan view of the filter cover taken on the line 4—4 in Fig. 2, the top plate of the filter container being shown in dotted lines.

Fig. 5 is a section taken on the line 5—5 in Fig. 2.

Fig. 6 illustrates the construction of the strips forming the filter element, one of the views being a side elevation of the strip before it is corrugated, and the other being a plan view of the strip after it is corrugated.

Description of device

The combined breather and oil filler includes a casting comprising a base 10 (Figs. 1 and 2) which is provided at its bottom with similar opposite extensions 11 (Figs. 1 and 5) apertured to receive screws 12 which have threaded engagement with crankcase 13 of internal combustion engine 14.

Base 10 not only provides a means for mounting the filter of the breather, but also includes the oil filler elbow. Elbow 17 (Figs. 1 and 2) is cast integrally with vertical cylindrical portion 18 of base 10 and provides passage 19 (Fig. 2) which opens into passage 21 in portion 18 through which lubricant is transmitted to the crankcase which has an opening in the top thereof coinciding with the opening in the bottom of base 10, as indicated in dotted lines in Fig. 1. The top opening in elbow 17 (Fig. 2) is normally closed by cap 22 pivoted on pin 23 in apertured ears 24 integral with elbow 17. Means are provided for sealing the opening in elbow 17 when the cap is in position to cover the elbow including gasket 26 secured to the under side of cap 22 and circumferential lip portion 27 of said cap. Clamp 28 (Figs. 1 and 2) is pivoted on elbow 17 and is adapted to engage cam surface 29 to urge cap 22 tightly in position, whereby a more effective sealing contact is obtained between said cap, gasket 26, and elbow 17.

As stated hereinbefore, cylindrical portion 18 (Fig. 2) of base 10 forms a part of the filter construction of the breather and said portion provides a seat for the filter container, whereby said element may be readily removed for cleaning or replacement after which it can again be easily secured in place within cylindrical portion 18. Said portion 18 is provided adjacent its top with inner peripheral rib 36 which is adapted to receive the filter container comprising cylindrical casing 37, end plates 38, 39, cover 41, and stud 42. Said casing 37 is seated in peripheral offset portions of said plates 38, 39 and houses filter element 43, which is compressed between said plates 38, 39.

Common means are provided for securing the members of the filter construction in assembled position and for mounting the filter on its base. Cover 41 and plates 39, 38 are provided with central apertures through which stud 42 passes, and said stud 42 has threaded engagement with boss 45 centrally formed in base 10. In assembled position plate 38 and the lower end of casing 37 are seated in cylindrical portion 18 on rib 36. It is believed to be obvious from the preceding description that it is only necessary to remove stud 42 to disassemble the entire filter assembly, so that filter element 43 can be removed for cleaning or replacing.

A plurality of passages are provided in the end plates of the filter assembly whereby air may pass into or out of the crankcase of the engine and whereby refuse-laden oil can drain in to a reservoir formed in base 10. Top plate 39 (Fig. 3) is provided with a plurality of apertures 46 which permit the ingress or egress of air to the filter through corresponding passages formed between depressed portions or protuberances 47 (Figs. 2 and 4) of cover 41 which has spaced overhanging lip 48 surrounding the top of member 37 to protect said apertures 46 from entry of foreign material. Depressed portions 47 engage plate 39 adjacent the periphery thereof substantially in alignment with the wall of casing 37. In assembly depressed portions 47 are positioned to contact plate 39 between apertures 46 therein as illustrated in Fig. 4, and, as depressed portions 47 and the central depressed portion of said cover 41, which receives the head of stud 42, contact plate 39 at spaced points, a rigid assembly of the filter construction is insured. Moreover this arrangement prevents accidental deforming of the cover which would interfere with the ingress or egress of air adjacent an aperture 46.

Bottom plate 38 is formed similarly to top plate 39 and has similar spaced apertures 49, which communicate with the crankcase of the engine, and provide drainage for refuse-laden oil. A passage is provided in the base from the filter to the crankcase comprising aperture 50 (Figs. 2 and 5) formed by cylindrical wall 51 integral with boss 45 and portion 18. Said wall 51 together with bottom wall 52 and cylindrical portion 18 form a reservoir for catching the refuse-laden oil drained from filter element 43. In assembly, plate 38 is placed in the base so that a solid portion thereof is above aperture 50 which communicates with the crankcase, and the apertures thereof are above the reservoir, as indicated in phantom lines in Fig. 5. This arrangement prevents the drainage of any refuse-laden oil into the crankcase of the engine. At intervals the oil present in the reservoir is drained through apertured boss 53 of base 10 by removing plug 54 which is threaded in said boss to close the passage formed therein.

The efficiency of filters of various types depends largely upon the amount of effective filtering surface which is presented to the fluid medium passing therethrough and to the even distribution of the strips or strands forming the filter element, whereby no openings are left to permit the free passage of the medium without contacting a filtering surface.

It has been found that where the filter element is made up of straight strips, packing often occurs due to the vibration of the vehicle in operation, so that distribution through the filter element is not even, some spaces being tightly packed and others being open. When this condition is present, the effectiveness of the filter is largely destroyed as it permits the ingress of unfiltered fluid with the consequent damage which its presence involves. The filter element disclosed herein provides a construction wherein the strands or strips are evenly distributed throughout the volume of the filter, and wherein substantially the entire group of strands have line or point contact only. This construction is obtained by using strips or strands which are regularly deformed so that when they are packed and interwoven to form the filter element, surface contact along the length of the strips is eliminated. The particular filter element as disclosed herein is adapted to filter the air which enters the crankcase of the engine through the breather, and is saturated with oil upon installation whereby each strip presents an oil-coated filtering surface. In operation the coating of oil is maintained by the oil-laden air and gases which are expelled from the crankcase.

As illustrated in Fig. 6, strips 56 are provided in the form of a corrugated ribbon and said element comprises an interwoven mass of said strips. Deformation in the form of corrugations has been found to be especially effective, but other types of deformation are adapted equally well to prevent surface contact between adjacent strips in the filter element. To obtain a greater effective filter surface the strips are formed with a rectangular cross section whereby a greater amount of the surface is exposed. Strips 56 are preferably formed of a non-corrosive metal as, for example, copper.

I, therefore, claim as my invention:

1. In a breather construction for the crankcase of an engine, a hollow base formed integrally of metal; said base having an upright tubular portion, a wall in said upright tubular portion and extending transversely across said upright portion, a second wall in said upright portion forming a sump with the inner surface of said upright tubular portion and with said first mentioned wall and providing a passage adjacent said sump for ingress and egress of air without flow thereof through said sump, and a drain passage leading from the bottom of said sump; and a filter casing mounted on said base, said filter casing having a bottom provided with an aperture and with a solid portion, the bottom being positioned on said base with said solid portion covering the passage adjacent the sump and said aperture being over said sump.

2. In a breather construction for the crankcase of an engine, a hollow base having an outside wall, an opening adapted to communicate with a filter and a second opening adapted to communicate with the interior of said crankcase; and walled partition means within said base and forming with the inner surface of said outside wall a closed bottom sump communicating with said first-mentioned opening to receive refuse laden fluid from said filter, said walled partition means also forming a passageway adjacent said sump for ingress and egress of air without flow thereof through said sump and extending between said first-mentioned opening and said second mentioned opening.

3. In a breather construction for the crankcase of an engine, a hollow casting of metal providing a base having an outside wall, an opening adapted to communicate with a filter and a second opening adapted to communicate with the interior of said crankcase; walled partition means within said base and forming with the inner surface of said outside wall a closed bottom sump communicating with said first-mentioned opening to receive refuse laden fluid from said filter, said walled partition means being cast as an integral part of said base and also forming a passageway adjacent said sump for ingress and egress of air without flow thereof through said sump, said passageway extending between said first-mentioned opening and said second mentioned opening; and a filter mounted on said base over said first-mentioned opening, the bottom of said filter having an aperture positioned over said sump.

4. In a breather construction for the crankcase of an engine, a hollow casting of metal providing a base having an outside wall, an opening adapted to communicate with a filter and a second opening adapted to communicate with the interior of said crankcase; walled partition means including an upstanding wall portion within said base and forming with the inner surface of said outside wall a closed bottom sump communicating with said first-mentioned opening to receive refuse laden fluid from said filter, said walled partition means being cast as an integral part of said base and also forming a passageway adjacent said sump for ingress and egress of air, said passageway extending between said first-mentioned opening and said second mentioned opening; a filter unit including a bottom having an aperture over said sump; and a fastening member screwed into said upstanding wall portion for securing the filter unit to said base.

5. In a breather construction for the crankcase of an engine, a hollow base having an outside wall, an opening adapted to communicate with a filter, and a second opening adapted to communicate with the interior of said crankcase; and walled partition means within said base and forming with the inner surface of said outside wall a sump communicating with said first-mentioned opening to receive refuse laden fluid from said filter, said walled partition means also forming a passageway independent of said sump for flow of air through said openings without flow thereof through said sump whereby the air flow is precluded from carrying refuse laden fluid from said sump into said crankcase, said sump and said passageway lying substantially entirely within the periphery of said first-mentioned opening.

6. In a breather construction for the crankcase of an engine, a hollow base having an opening adapted to communicate with a filter and a second opening adapted to communicate with the interior of said crankcase, and partition means between said openings forming a sump for receiving refuse laden fluid from said filter and forming a passageway independent of said sump for flow of air through said openings without flow thereof through said sump whereby the air flow is precluded from carrying refuse laden fluid from said sump into the crankcase.

7. In a breather construction for the crankcase of an engine, a hollow base having an opening adapted to communicate with a filter and a second opening adapted to communicate with the interior of said crankcase, and walled partition means within said base between said openings and forming with a wall of said base a walled sump for receiving refuse laden fluid from said filter, said walled partition means also forming a passageway within said base independent of and adjacent said sump for flow of air through said openings without flow thereof through said sump whereby the air flow is precluded from carrying refuse laden fluid from said sump into the crankcase.

8. In a filter construction for removing foreign matter from a fluid medium, a tubular filter container having an apertured end for admitting the medium to be filtered, filtering means in said container, a cover over said end and having a substantial portion thereof spaced from said end to allow free flow of the medium between said cover and said end, and spaced protuberances adjacent the periphery of said cover between said cover and said end to maintain the spacing of said cover from said end and to prevent accidental deforming of said cover.

9. In a breather construction for providing ingress and egress of air to the crankcase of an engine; a base adapted for rigid attachment to said crankcase and having passageway means adapted to communicate with said crankcase; a filter assembly adapted to cooperate with said passageway means, said assembly including filtering means and a plurality of separable elements for housing said filtering means; and means including a member having threaded engagement with said base for detachably securing the elements of said assembly together as a unit and for detachably securing said assembled unit to said base.

10. A breather for the crankcase of an engine, having an opening adapted to communicate with filtering means and a second opening adapted to communicate with the interior of said crankcase, a sump for receiving refuse laden fluid from said filtering means, and means between said openings forming a passageway independent of said sump for ingress and egress of air through said openings without flow thereof through said sump whereby the air flow is precluded from carrying refuse laden fluid from said sump into said crankcase.

HARMON S. EBERHARD.